United States Patent
Al-Enizi et al.

(10) Patent No.: US 10,026,970 B1
(45) Date of Patent: Jul. 17, 2018

(54) OXYGEN REDUCTION REACTION ELECTROCATALYST

(71) Applicant: KING SAUD UNIVERSITY, Riyadh (SA)

(72) Inventors: Abdullah M. Al-Enizi, Riyadh (SA); Tansir Ahamad, Riyadh (SA); Saad M. Alshehri, Riyadh (SA); Mu Naushad, Riyadh (SA)

(73) Assignee: KING SAUD UNIVERSITY, Riyadh (SA)

( * ) Notice: Subject to any disclaimer, the term of this patent is extended or adjusted under 35 U.S.C. 154(b) by 0 days.

(21) Appl. No.: 15/839,693

(22) Filed: Dec. 12, 2017

(51) Int. Cl.
  *H01M 4/92* (2006.01)
  *C08G 12/30* (2006.01)
  *H01M 8/1018* (2016.01)

(52) U.S. Cl.
  CPC ............ *H01M 4/926* (2013.01); *C08G 12/30* (2013.01); *H01M 8/1018* (2013.01); *H01M 2008/1095* (2013.01)

(58) Field of Classification Search
  None
  See application file for complete search history.

(56) References Cited

U.S. PATENT DOCUMENTS

| | | | |
|---|---|---|---|
| 4,832,869 A | 5/1989 | Colts | |
| 8,709,127 B2 | 4/2014 | Cai et al. | |
| 2008/0292931 A1 | 11/2008 | Schwartz et al. | |
| 2010/0304266 A1 | 12/2010 | Periyasamy et al. | |
| 2012/0129686 A1 | 5/2012 | Querner et al. | |
| 2012/0258850 A1* | 10/2012 | Kuo | B01J 21/185 502/5 |
| 2017/0033369 A1 | 2/2017 | Burton et al. | |

FOREIGN PATENT DOCUMENTS

| EP | 1079452 B1 | 11/2006 |
|---|---|---|
| JP | 2013-94771 | * 5/2013 |

OTHER PUBLICATIONS

Yang et al. "Porous N-doped Carbon Prepared from Triazine-Based Polypyrrole Network: A Highly Efficient Metal-Free Catalyst for Oxygen Reduction Reaction in Alkaline Electrolytes." ACS Appl. Mater. Interfaces 2016, 8, 28615-28623. (Year: 2016).*

Kulesza, Pawel J., et al. "Network films composed of conducting polymer-linked and polyoxometalate-stabilized platinum nanoparticles." Chemistry of materials 16.21 (2004): 412.

Holze, R., and Y. P. Wu. "Intrinsically conducting polymers in electrochemical energy technology: Trends and progress." Electrochimica acta 122 (2014): 93-107.

* cited by examiner

*Primary Examiner* — Alix Eggerding
(74) *Attorney, Agent, or Firm* — Richard C. Litman (57) ABSTRACT

The oxygen reduction reaction electrocatalyst is a Pt/N/C electrocatalyst that provides an efficient ORR catalyst suitable for use in polymer electrolyte membrane (PEM) fuel cells, for example. The oxygen reduction reaction electrocatalyst is in the form of platinum nanoparticles embedded in a nitrogen-enriched mesoporous carbon matrix, particularly a nitrogen-enriched graphite matrix. The nitrogen-enriched graphite matrix has an average surface area of 240.4 m²/g, and the platinum nanoparticles each have an average diameter between 10 nm and 12 nm.

8 Claims, 8 Drawing Sheets

OXYGEN REDUCTION REACTION ELECTROCATALYST

BACKGROUND

1. Field

The disclosure of the present patent application relates to electrocatalysts, and particularly to an oxygen reduction reaction electrocatalyst made of platinum nanoparticles embedded in a nitrogen-enriched mesoporous carbon matrix.

2. Description of the Related Art

Polymer electrolyte membrane (PEM) fuel cells are presently of great interest due to global concerns regarding fossil fuels and the corresponding drive to find alternative, ecologically friendly energy sources. The polymer electrolyte membrane fuel cell transforms the chemical energy liberated during the electrochemical reaction of hydrogen and oxygen to electrical energy, as opposed to the direct combustion of hydrogen and oxygen gases to produce thermal energy. In operation, a stream of hydrogen is delivered to the anode side of a membrane electrode assembly (MEA). At the anode side, the hydrogen is catalytically split into protons and electrons. This oxidation half-cell reaction or hydrogen oxidation reaction (HOR) is represented by $H_2 \rightarrow 2H^+ + 2e^-$.

The newly formed protons permeate through the polymer electrolyte membrane to the cathode side. The electrons travel along an external load circuit to the cathode side of the MEA, thus creating the current output of the fuel cell. Meanwhile, a stream of oxygen is delivered to the cathode side of the MEA. At the cathode side, oxygen molecules react with the protons permeating through the polymer electrolyte membrane and the electrons arriving through the external circuit to form water molecules. This reduction half-cell reaction or oxygen reduction reaction (ORR) is represented by $\frac{1}{2}O_2 + 2H^+ + 2e^- \rightarrow H_2O$.

In the PEM, the splitting of the hydrogen molecule is relatively easy by using a platinum catalyst. Unfortunately, splitting the oxygen molecule is more difficult, and this causes significant electric losses. An appropriate catalyst material for this process has not yet been discovered, and platinum is typically seen as the best option. At present, nearly all PEM fuel cells use platinum (Pt) particles on porous carbon (C) supports to catalyze both hydrogen oxidation and oxygen reduction. However, due to their high cost, current Pt/C catalysts are not feasible for commercialization. The U.S. Department of Energy estimates that platinum-based catalysts will need to use roughly four times less platinum than is used in current PEM fuel cell designs in order to represent a realistic alternative to internal combustion engines. Consequently, one main goal of catalyst design for PEM fuel cells is to increase the catalytic activity of platinum by a factor of four so that only one-fourth as much of the precious metal is necessary to achieve similar performance.

Since the most common and effective catalyst, platinum, is extremely expensive, alternative processing is necessary to maximize surface area and minimize loading. Deposition of nanosized Pt particles onto carbon powder (Pt/C) provides a large Pt surface area, while the carbon allows for electrical connection between the catalyst and the rest of the cell. Platinum is so effective because it has high activity and bonds to the hydrogen just strongly enough to facilitate electron transfer but not inhibit the hydrogen from continuing to move around the cell. However, platinum is less active in the cathode oxygen reduction reaction. This necessitates the use of more platinum, increasing the cell's expense and thus feasibility.

Common present methods for forming nanoscale Pt on carbon powder include vacuum deposition, sputtering and electrodeposition. The platinum particles are deposited onto carbon paper that is permeated with PTFE. These processes, however, are not easy to scale for industrial or large-scale manufacturing purposes. Additionally, in each method, the amount and shape of the catalyst is limited by the constraints of other materials used in the process. Thus, an oxygen reduction reaction electrocatalyst solving the aforementioned problems are desired.

SUMMARY

The oxygen reduction reaction electrocatalyst is a Pt/N/C electrocatalyst that provides an efficient ORR catalyst suitable for use in polymer electrolyte membrane (PEM) fuel cells, for example. The oxygen reduction reaction electrocatalyst is in the form of platinum nanoparticles embedded in a nitrogen-enriched mesoporous carbon matrix, particularly a nitrogen-enriched graphite matrix. The nitrogen-enriched graphite matrix has an average surface area of 240.4 $m^2/g$, and the platinum nanoparticles each have an average diameter between 10 nm and 12 nm.

The oxygen reduction reaction electrocatalyst is made by first preparing a hydrazine derivative. Hydrazine hydrate is reacted with cyanuric chloride in acetonitrile to form the hydrazine derivative 2,4,6-trihydrazinyl-1,3,5-triazine. which is then reacted with terephthaldehyde in dimethyl sulfoxide (DMSO) to form a polymeric solution, and this polymeric solution is refluxed for 30 hours under inert conditions to produce a conductive polymer.

The conductive polymer is added to methanol to form a polymeric suspension, to which $H_2PtCl_4$ is added to form a mixture. The mixture is stirred for one hour at room temperature, and then sonicated at 40° C. for four hours. The stirred and sonicated mixture is left to stand at room temperature and then dried to yield platinum nanoparticles contained within the conductive polymer. The platinum nanoparticles contained within the conductive polymer are then annealed in a tube furnace at 800° C., with a heating rate of 5° C./min, under the flow of helium to yield the oxygen reduction reaction electrocatalyst, comprising platinum nanoparticles embedded in a mesoporous graphitic carbon matrix.

These and other features of the present invention will become readily apparent upon further review of the following specification.

BRIEF DESCRIPTION OF THE DRAWINGS

Similar reference characters denote corresponding features consistently throughout the attached drawings.

DETAILED DESCRIPTION OF THE PREFERRED EMBODIMENTS

The oxygen reduction reaction electrocatalyst is a Pt/N/C electrocatalyst that provides an efficient ORR catalyst suitable for use in polymer electrolyte membrane (PEM) fuel cells, for example. The oxygen reduction reaction electrocatalyst is in the form of platinum nanoparticles embedded in a nitrogen-enriched mesoporous carbon matrix, particularly a nitrogen-enriched graphite matrix. The nitrogen-enriched graphite matrix has an average surface area of 240.4 $m^2/g$, and the platinum nanoparticles have an average diameter between 10 nm and 12 nm.

The structure, synthesis, and characterization of the oxygen reduction reaction electrocatalyst is exemplified in the following examples.

Example 1

Synthesis of Conductive Polymer

Figure 1:
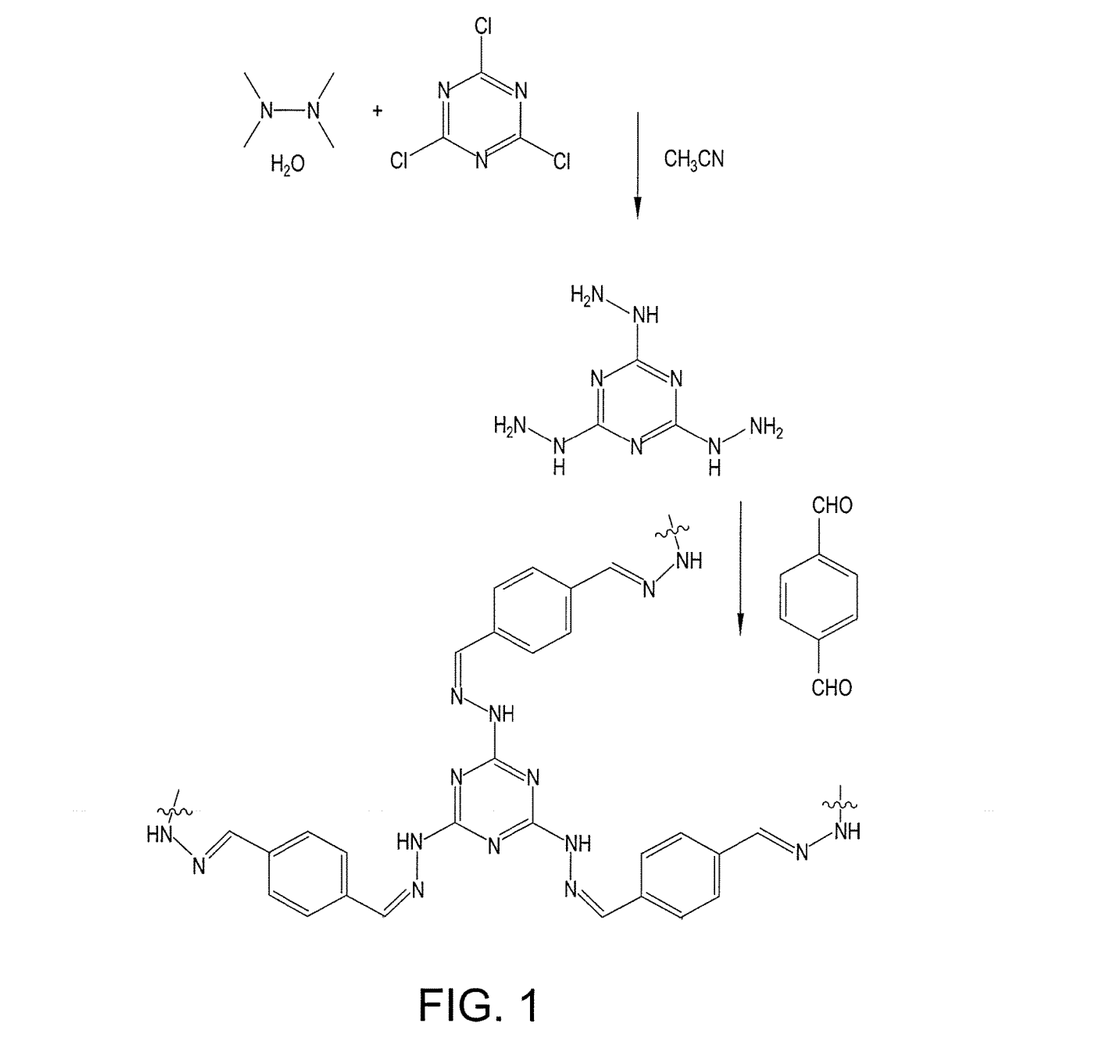
FIG. 1 is a reaction scheme for the synthesis of a conduction polymer that forms the mesoporous carbon matrix for an oxygen reduction reaction electrocatalyst.

Referring to FIG. 1, the oxygen reduction reaction electrocatalyst is made by first preparing a hydrazine derivative. Hydrazine hydrate (20 mL, 80%) is reacted with cyanuric chloride (20 mmol) in 50 mL of acetonitrile at 0° C. to form the hydrazine derivative 2,4,6-trihydrazinyl-1,3,5-triazine. Then, the 2,4,6-trihydrazinyl-1,3,5-triazine (40 mmol) is reacted with p-terephthaldehyde (60 mmol) in 100 mL of dimethyl sulfoxide (DMSO) to form a polymeric solution, and this polymeric solution is refluxed for 30 hours under inert conditions to produce a conductive polymer, the monomer having the structure shown in FIG. 1. The conductive polymer contains azomethine networks, which appear as a yellow solid.

Example 2

Synthesis of Oxygen Reduction Reaction Electrocatalyst

Figure 2:
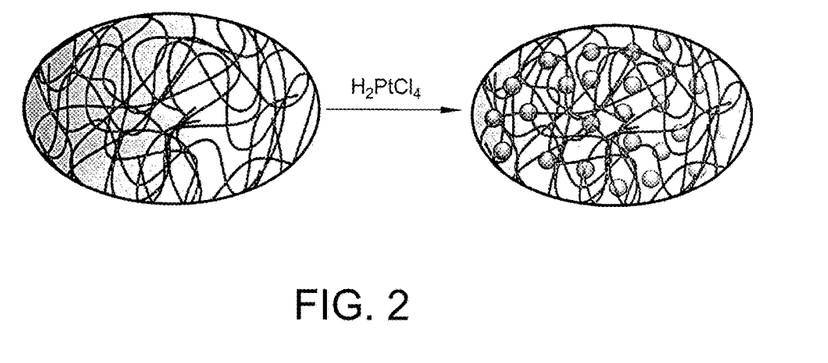
FIG. 2 is a pictorial diagram of a reaction scheme for the synthesis of an oxygen reduction reaction electrocatalyst from the conduction polymer of FIG. 1.

The conductive polymer is washed and dried before being added to methanol to form a polymeric suspension (0.1 g in 50 mL of methanol). $H_2PtCL_4$ (50 mL, $10^{-3}$ M in acidic water) is then added to the polymeric suspension to form a mixture. The mixture is stirred for one hour at room temperature, and then sonicated at 40° C. for four hours. During the stirring and sonicating, the mixture changes color from light yellow to black. The stirred and sonicated mixture is left to stand at room temperature for six hours and then dried at room temperature to yield platinum nanoparticles contained in the conductive polymer. The conductive polymer containing the platinum nanoparticles is then washed and filtered off. The conductive polymer containing the platinum nanoparticles is then annealed in a tube furnace at 800° C. with a heating rate of 5° C./min under the flow of helium (100 mL/min) to yield the oxygen reduction reaction electrocatalyst, shown diagrammatically in FIG. 2. The oxygen reduction reaction electrocatalyst is black in color, and the final products are dispersed in 1 M HCl solution and stirred for two hours to partially remove impurities.

Figure 10:
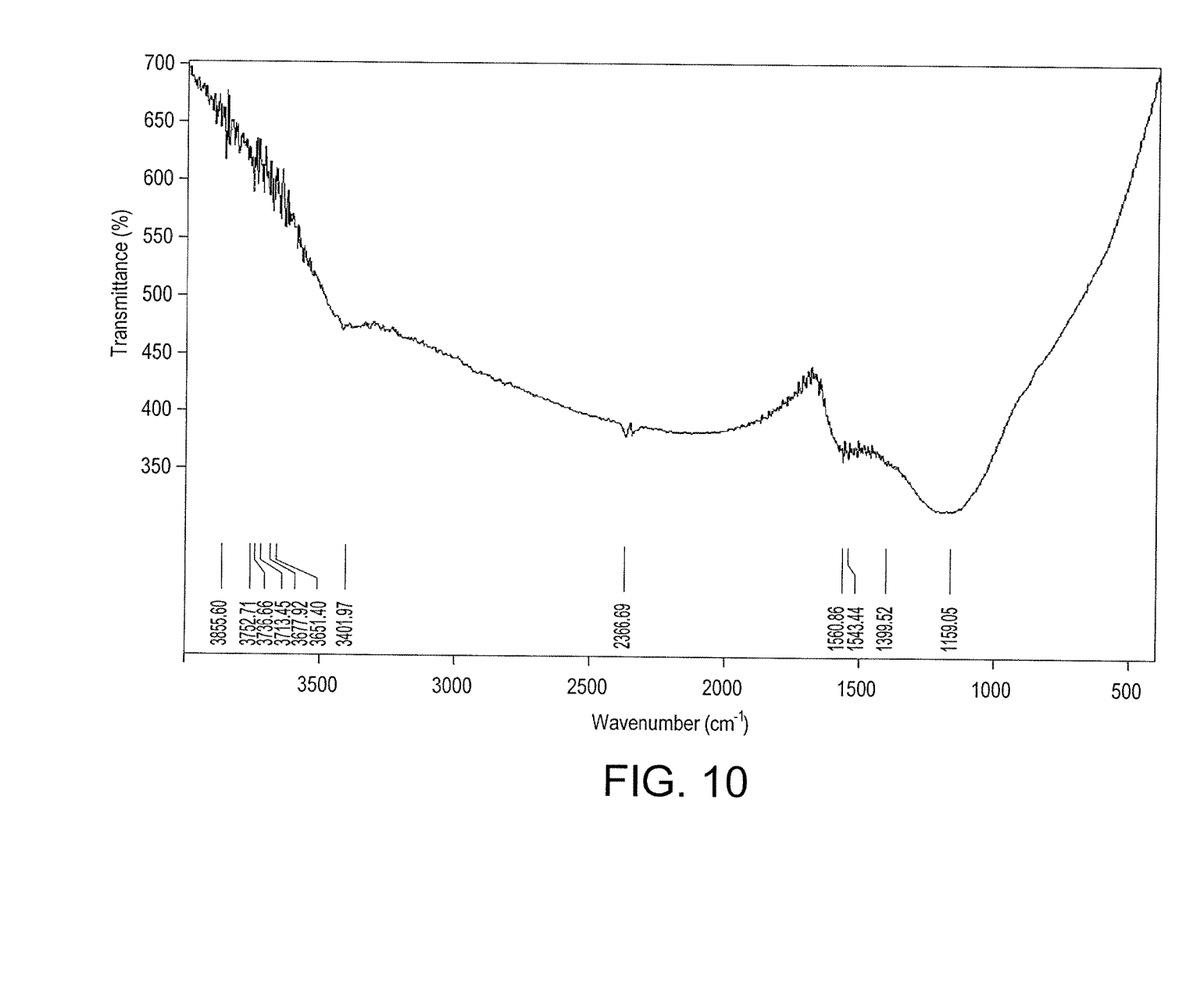
FIG. 10 is a graph showing Fourier-transform infrared spectroscopy (FTIR) transmittance results of the oxygen reduction reaction electrocatalyst.

FIG. 10 is a graph showing Fourier-transform infrared spectroscopy (FTIR) transmittance results of the oxygen reduction reaction electrocatalyst. The FTIR spectra show that the conducting polymer has C=N and C=C bonds, and the prepared Pt nanoparticles have no chemical bonding with the polymer matrix. For the electrocatalyst, the peaks around 1126 and 1400 $cm^{-1}$ belong to the C—H vibrations, and the peaks around 1635 and 1535 $cm^{-1}$ correspond to C=N and C=C vibrations, respectively.

Figure 11:
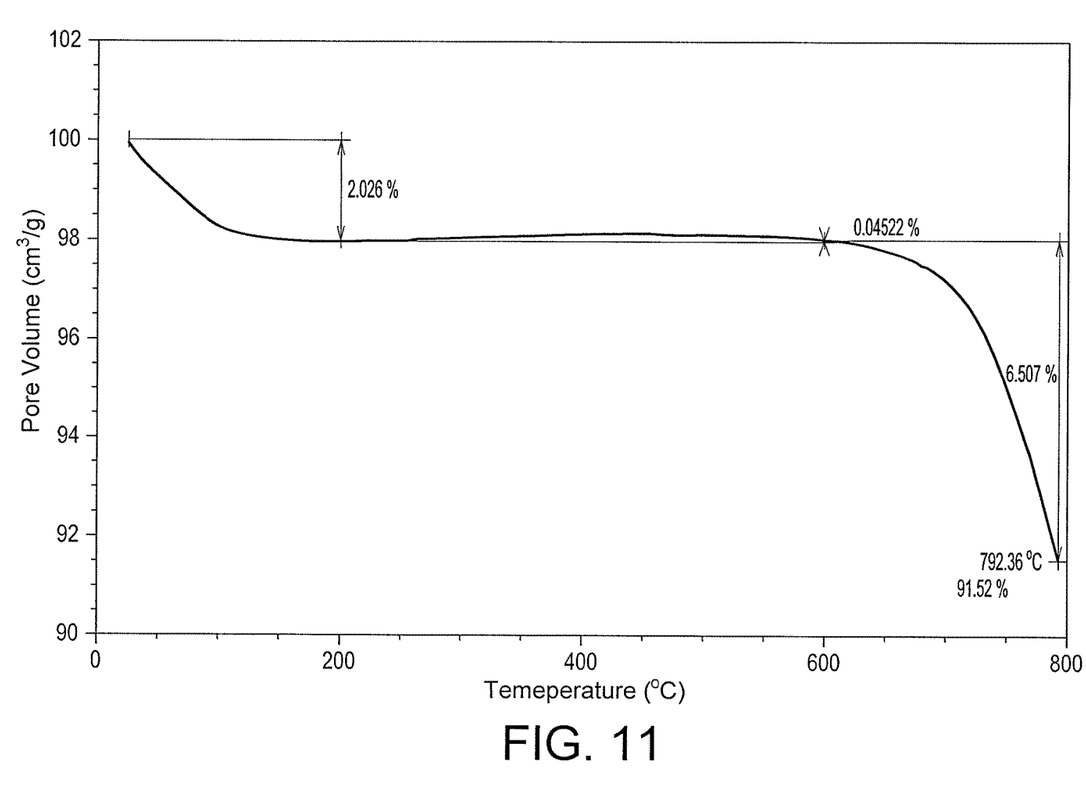
FIG. 11 is a graph showing thermogravimetric analysis and differential scanning calorimetry (TGA/DTA/DSC) results of the oxygen reduction reaction electrocatalyst.

FIG. 11 is a graph showing thermogravimetric analysis and differential scanning calorimetry (TGA/DTA/DSC) results of the oxygen reduction reaction electrocatalyst. Thermogravimetric analysis was conducted in an inert atmosphere from room temperature to 800° C. The TGA/DTA/DSC thermogram results reveal that the prepared electrocatalyst was decomposed in two stages. The first degradation stage was up to 200° C., due to the removal of moisture and adsorbed water. The second degradation stage was between 200-600° C., that is, the second degradation stage was the main degradation stage, and it may have been due to the degradation of the main organic continents. The residue weight 91.50% was observed at 800° C. as Pt and carbon residue.

Example 3

Nitrogen Adsorption-Desorption Isotherm

Figure 3:
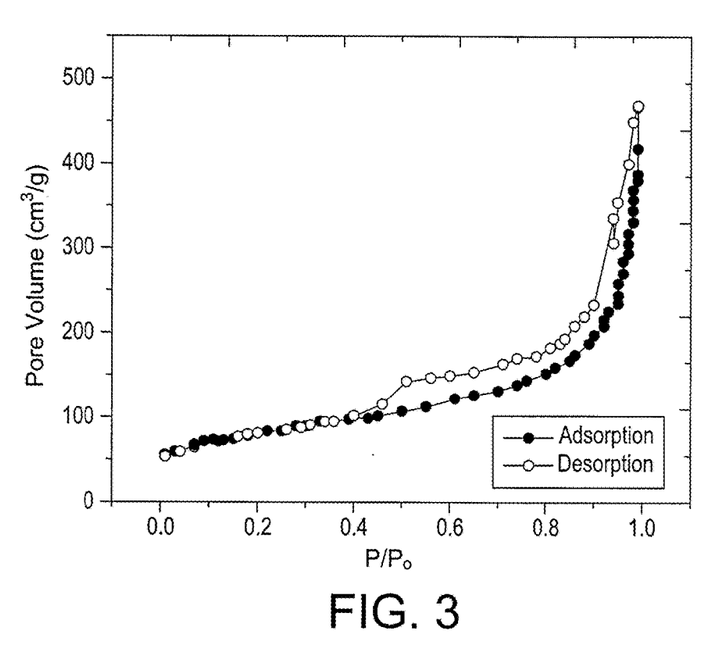
FIG. 3 is a plot of $N_2$ adsorption-desorption measurements of the oxygen reduction reaction electrocatalyst synthesized according to FIGS. 1 and 2.

FIG. 3 shows $N_2$ adsorption-desorption measurements to measure the porosity and surface nature of the oxygen reduction reaction electrocatalyst, which is a natural adsorbent. The adsorption isotherms are type IV for both the platinum nanoparticles and the nanoporous carbon support. Specific surface area was calculated using the Brunauer-Emmett-Teller (BET) method and the pore size distribution plot was derived based on the Barrett-Joyner-Halenda (BJH) method. The Brunauer-Emmett-Teller (BET) surface area of the natural adsorbent was found to be 240.4 $m^2/g$.

Example 4

TEM Morphology

Figure 4:
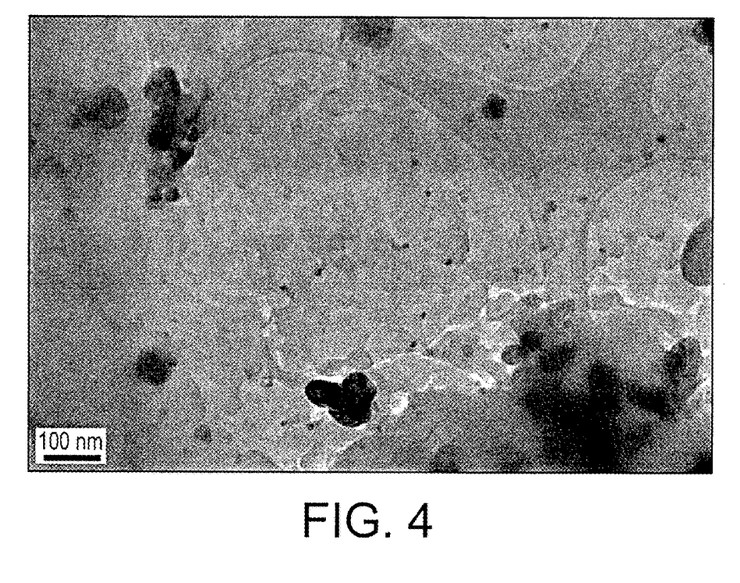
FIG. 4 is a tunneling electron microscope (TEM) micrograph of the oxygen reduction reaction electrocatalyst synthesized according to FIGS. 1 and 2.

Morphology and particles sizes were determined using both field emission scanning electron microscopy (FESEM) and transmission electron microscopy (FE-TEM). FIG. 4 is a tunneling electron microscope (TEM) micrograph of the electrocatalyst prepared according to Examples 1 and 2. The TEM image clearly shows the platinum nanoparticles embedded in the carbon matrix with irregular particles size of about 10-12 nm.

Example 5

X-Ray Powder Diffraction

Figure 5:
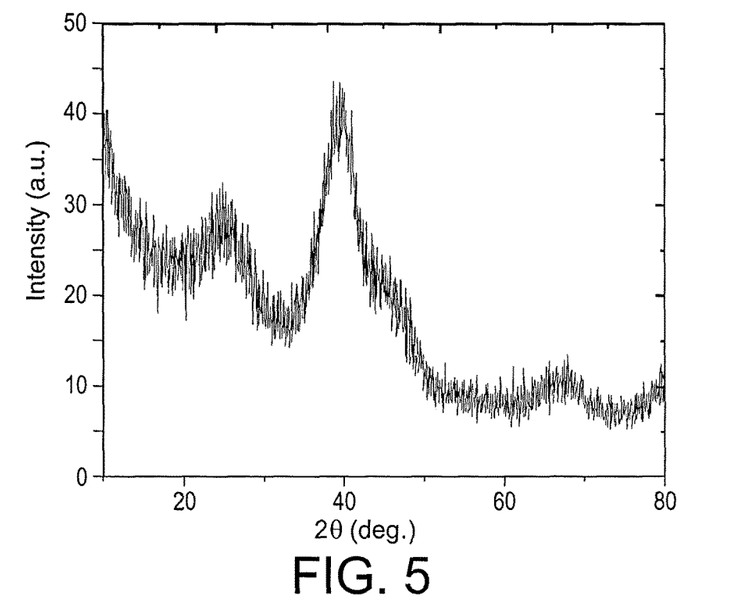
FIG. 5 is the X-ray diffraction (XRD) spectrum of the oxygen reduction reaction electrocatalyst synthesized according to FIGS. 1 and 2.

FIG. 5 shows the X-ray diffraction (XRD) spectrum of the electrocatalyst prepared according to Examples 1 and 2. The diffraction peaks are found at 2θ values of about 39.8, 46.3, 67.6 and 81.5, which are ascribed to the facets (111), (200), (220) and (311), characteristic of face-centered cubic (fcc) crystalline Pt (JCPDS, Card No. 04-0802), suggesting that the Pt species were reduced to the metallic state by the conduction polymer. One other broad diffraction peak is found at a 2θ value of about 26°, which could be ascribed to graphitic carbon.

Example 6

Voltammetry

Figure 6:
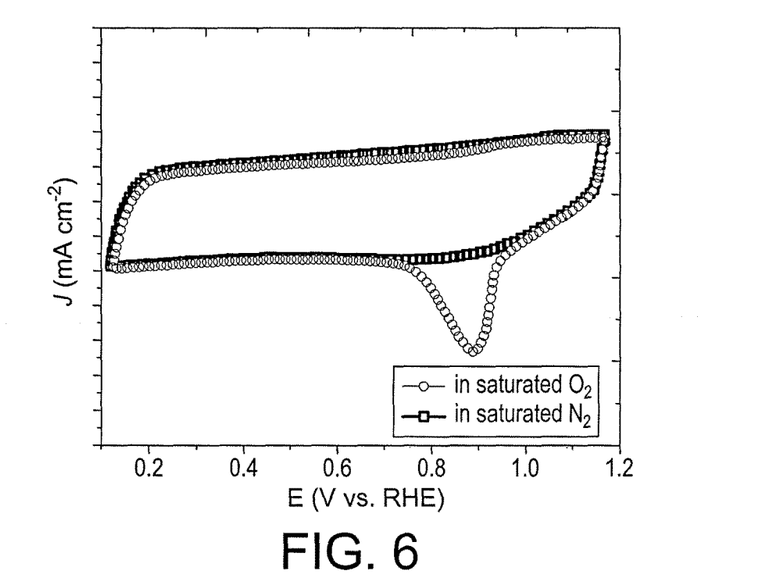
FIG. 6 are cyclic voltammetry curves for the oxygen reduction reaction electrocatalyst in 0.1 M KOH, saturated with both $N_2$ and $O_2$.

FIG. 6 shows the cyclic voltammetry curves of the electrocatalyst prepared according to Examples 1 and 2 in 0.1 M KOH saturated with $N_2$ and $O_2$. The cyclic voltammetry results reveal that there is a cathodic (i.e., oxygen reduction) peak in $O_2$-saturated 0.1 M KOH solution at 0.887 V. However, no redox peaks were observed with $N_2$-saturated 0.1 M KOH solution. Prominent catalytic activity was observed for the oxygen reduction reaction (ORR) in an alkaline medium. For the cyclic voltammetry, 5 mg of the present electrocatalyst and 30 μl of 5 wt % Nafion solution were dispersed in 1 mL of ethanol, followed by at least 30 minutes of sonication to form a homogeneous ink. 2.4 μL of the catalyst ink (containing 12 μg of electrocatalyst) was loaded onto a glassy carbon electrode having a diameter of 3 mm (loading ~0.17 mg/cm$^2$). Cyclic voltammetry (CV) (using a potentiostat from CH660 Instruments) was conducted in an electrochemical cell using Ag/AgCl as the reference electrode, platinum as the counter electrode, and the glassy carbon electrode as the working electrode. The KOH electrolyte was saturated with oxygen and nitrogen by bubbling prior to the start of each experiment. A flow of $O_2$ was maintained over the electrolyte during the recording of CVs in order to ensure continued $O_2$ saturation. The working electrode was cycled at least five times before data were recorded at a scan rate of 10 mV/s.

Figure 7:
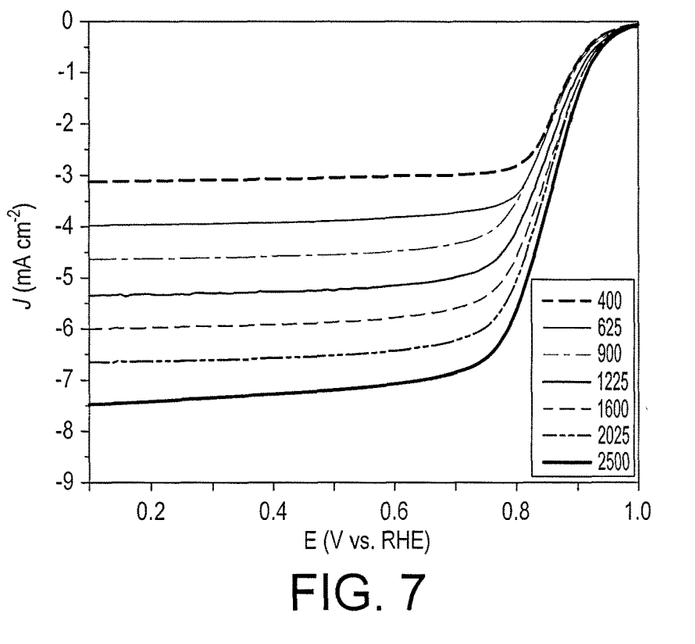
FIG. 7 are linear sweep voltammetry (LSV) curves for the oxygen reduction reaction electrocatalyst at different rotation rates in rotating disc electrode (RDE) measurements in $O_2$-saturated 0.1 M KOH at 10 mV/s.

FIG. 7 shows the linear sweep voltammetry (LSV) curves for the present electrocatalyst at different rotation rates in rotating disc electrode (RDE) measurements in $O_2$-saturated 0.1 M KOH at 10 mV/s. For the RDE measurements, catalyst inks were prepared by the same method as for cyclic voltammetry. About 4 pt of ink (containing 20 μg of catalyst) was loaded on a glassy carbon rotating disk electrode of 5 mm in diameter (ALS Instruments +CH1600), giving a loading of 0.1 mg/cm$^2$, The working electrode was scanned cathodically at a rate of 10 mVs$^{-1}$ with varying rotation speed from 225 rpm to 2500 rpm. The present electrocatalyst shows a high onset potential ($E_o$) and half-wave potential ($E_{1/2}$) of 0.996 V and 0.875 V, respectively. It was observed that the limit diffusion current density was increased with an increase in rotation rate due to the diffusion distance of the $O_2$-saturation.

Figure 8:
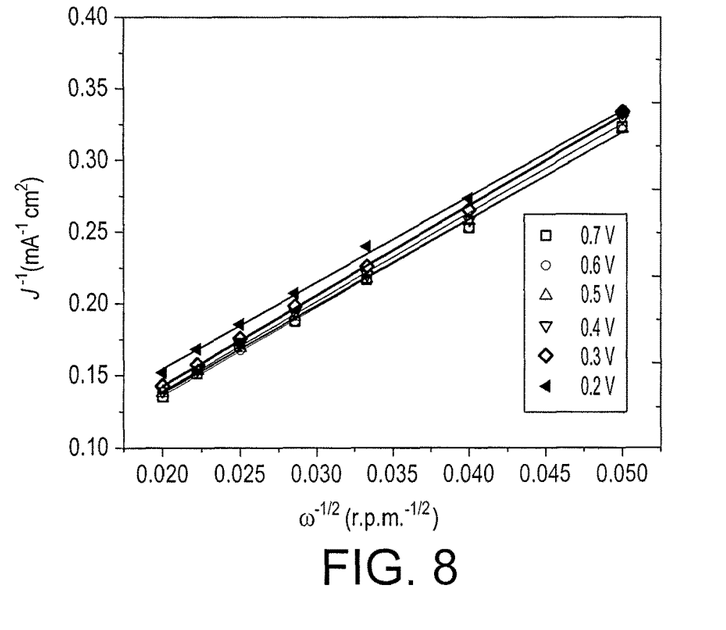
FIG. 8 are Koutecky-Levich (K-L) plots corresponding to the LSV curves of FIG. 7.

FIG. 8 shows the Koutecky-Levich (K-L) plots corresponding to FIG. 5, which are used to determine the kinetic parameters and the number of electron transfers per molecule of oxygen. The present electrocatalyst shows good linearity and nearly parallel fitted lines between $j^{-1}$ and $\omega^{-1/2}$ of the K-L plots, indicating a first-order reaction towards the oxygen reduction. The number of electrons transferred (n) was calculated to be in the range of 3.97 for a potential range of 0.0-0.90 V, which indicates that it favors a 4e$^-$ oxygen reduction.

The Koutecky-Levich plots ($j^{-1}$ vs. $\omega^{-1/2}$) were analyzed at various electrode potentials. The slopes of their best linear fit lines were used to calculate the number of electrons transferred (n) on the basis of the Koutecky-Levich equation:

$$\frac{1}{J} = \frac{1}{J_L} + \frac{1}{J_k} = \frac{1}{B\omega^{1/2}} + \frac{1}{J_k}$$

where B=0.62 nFC$_o$(D$_o$)$^{2/3}$v$^{-1/6}$=1.152×10$^{-4}$ A cm$^{-2}$s$^{1/2}$ rad$^{-1/2}$ and J$_k$=nFkC$_o$. Here, J is the current density (A·cm$^{-2}$), J$_k$ is the kinetic current density (A·cm$^{-2}$), J$_L$ is the diffusion-limiting current density (A·cm$^{-2}$), F is Faraday's constant (96485, C·mol$^{-1}$), D$_o$ is the diffusion coefficient of O$_2$ in 0.1 M KOH (1.93×10$^{-5}$, cm$^2$/s), v is the kinematic viscosity of the electrolyte (0.1 M KOH) (1.09×10$^{-2}$ cm$^2$/s), C$_o$ is the saturation concentration of O$_2$ in 0.1 M KOH at 1 atm O$_2$ pressure (1.26×10$^{-6}$ mol·cm$^3$), and ω is the rotation rate (rad/s).

Figure 9:
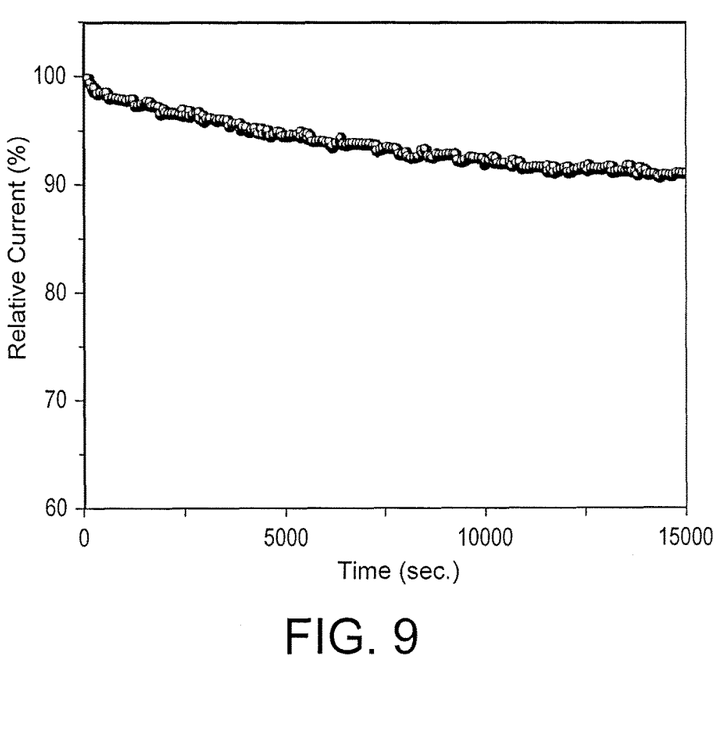
FIG. 9 is a graph of percent relative current as a function of time, showing the chronoamperometric response of the oxygen reduction reaction electrocatalyst.

FIG. 9 shows the durability of the present electrocatalyst. The chronoamperometric response of the electrocatalyst was carried out in 0.1M KOH solution (O$_2$-saturated) with a rotation rate of 1,600 rpm at 0.6V for 15,000 s. The results revealed that about 90% of the original current density was retained.

It is to be understood that the oxygen reduction reaction electrocatalyst and method of making the same is not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. An oxygen reduction reaction electrocatalyst, comprising platinum nanoparticles embedded in a nitrogen-enriched mesoporous graphite matrix having an average surface area of 240.4 m2/g.

2. The oxygen reduction reaction electrocatalyst as recited in claim 1, wherein the platinum nanoparticles each have an average diameter between 10 nm and 12 nm.

3. A method of making an oxygen reduction reaction electrocatalyst, comprising the steps of:
   reacting 2,4,6-trihydrazinyl-1,3,5-triazine with p-terephthaldehyde in an organic solvent to form a polymeric solution;
   refluxing the polymeric solution to produce a conductive polymer having the structure:

adding the conductive polymer to methanol to form a polymeric suspension;

adding H2PtCl4 to the polymeric suspension to form a mixture;

stirring and sonicating the mixture;

drying the stirred and sonicated mixture to yield platinum nanoparticles suspended in the conductive polymer; and annealing the suspension of platinum nanoparticles in the conductive polymer to yield platinum nanoparticles embedded in a mesoporous, graphitic carbon matrix forming the oxygen reduction reaction electrocatalyst.

4. The method of making an oxygen reduction reaction electrocatalyst as recited in claim 3, further comprising the step of reacting hydrazine hydrate with cyanuric chloride in a polar organic solvent to form the 2,4,6-trihydrazinyl-1,3,5-triazine.

5. The method of making an oxygen reduction reaction electrocatalyst as recited in claim 3, wherein the step of refluxing the polymeric solution comprises refluxing the polymeric solution for 30 hours.

6. The method of making an oxygen reduction reaction electrocatalyst as recited in claim 5, wherein the step of stirring and sonicating the mixture comprises stirring the mixture for one hour at room temperature.

7. The method of making an oxygen reduction reaction electrocatalyst as recited in claim 6, wherein the step of stirring and sonicating the mixture further comprises sonicating the mixture at a temperature of 40° C. for four hours.

8. The method of making an oxygen reduction reaction electrocatalyst as recited in claim 7, wherein the annealing step comprises annealing the suspension of platinum nanoparticles in the conductive polymer in a tube furnace at a temperature of 800° C. at a heating rate of 5° C./min.

* * * * *